Patented Sept. 27, 1932

1,879,503

UNITED STATES PATENT OFFICE

ERIK LUDVIG RINMAN, OF DJURSHOLM, SWEDEN

METHOD OF RELIEVING ALKALINE SOLUTIONS, PARTICULARLY WASTE LIQUORS FROM THE SODA OR SULPHATE PULP MANUFACTURE, OF SILICA

No Drawing. Application filed October 7, 1931, Serial No. 567,476, and in Sweden August 22, 1931.

In several manufacturing processes in which alkaline solutions, for instance regenerated caustic soda lye, are used, great difficulties are caused by silica which may have entered the lye during its use, or during the regeneration of the lye. The present invention relates to a method according to which such silica may be easily removed so that its detrimental effect is obviated, and which method may even be carried out in such manner that the separated silica may be directly brought to good use.

The present method consists principally in adding to the alkaline solution which it is desired to relieve of silica, one or several oxides, hydroxides, or other compounds, of metals the silicates of which are insoluble or are of limited solubility in the alkaline solution, such as for instance aluminium, zinc, barium, strontium, calcium, magnesium, and so forth. Simultaneously with or after such admixture the solution is treated with an absorption agent which is capable of absorbing from the solution the slimy silicate formed. Among suitable such absorption agents, cellulosic fibres, saw-dust, active carbon, or the like, may be mentioned. Finally, the absorption agent thus added together with the precipitate of silicate present therein is separated from the solution, which is thus obtained practically free from silica.

Of the metal hydroxides above mentioned, aluminium hydroxide is the most efficient one. This hydroxide is preferably added in the state of a solution of sodium aluminate, and will then form with the silica the compound $Na.Al.2SiO_3$, or $Na.Al.SiO_4$, both of which are insoluble in diluted caustic soda lye. Thus, if it is desired to obtain the treated alkaline solution practically free from silica as well as from the precipitating agent, a quantity of aluminium hydroxide should be added which is at least equivalent to the quantity of silica according to the formula $Na.Al.2SiO_3$. Still, even if a somewhat greater quantity of aluminium hydroxide is chosen, all aluminium hydroxide will be completely precipitated. This is due to the fact that when using aluminium hydroxide there is a margin upwards which is even wider than what corresponds to the compound

since also the compound

is insoluble in diluted caustic soda lye.

Of alkaline solutions containing silica and from which it is desired to recover the alkali, the most common ones are the waste liquors from the soda or sulphate pulp manufacture. For obtaining such waste liquors free from silica it is most suitable to carry out the treatment to remove the silica in the digester in which the pulp is being produced, by adding to the digester liquor, before or during the digestion, the required quantity of metal hydroxide, preferably in a dissolved state, so that it becomes intimately mixed with the digester liquor.

The silicate formed will then be precipitated on or in the cellulose fibre, which in this case serves as an absorption agent, and is retained by the fibre when the waste liquor is separated from the fibre after the digestion is completed. Only in the case that it is not suitable, in view of the intended use of the cellulose produced, to precipitate the silicate on the cellulose fibre, is resort taken to the method of separating the silica from the waste liquor after the latter has been separated from the cellulose.

Fir and pine wood is practically free from silica. Nevertheless, a sulphate waste liquor obtained from digestion of such wood, contains silica which is due to said substance getting into the digester liquor during the regeneration of the same. Since the capability of the lime to precipitate silica during the causticization of the fresh liquor is limited, the content of silica in the digester liquor usually rises to 1.5 per cent, if the liquor contains approximately 100 g. $Na_2O$ per liter, and if a sand filter is used for the filtration of the fresh liquor. Since it is usual to use about 4 cu.m. fresh liquor per 1000 kg. kraft pulp, there will be 60 kg. $SiO_2$ in each ton kraft pulp, if the silica is precipitated on the fibre during the digestion by treatment with sodium aluminate. In addition to the silica, about 30 kg. $Al_2O_3$ is also precipitated.

If in a sulphate mill a rotary digester and heating with direct steam are employed, it is preferable to introduce the aluminate solution or the aluminium hydroxide before the digestion is begun. Again, if indirect heating is employed, the aluminate solution should only be introduced towards the end of the digestion, in order to prevent precipitated silicate from entering the preheater for the liquor. For this purpose the aluminate solution is suitably pumped into the conduit connecting the preheater and the digester, so slowly that the time required for pumping in the solution is at least equal to that required for one circulation of the digester liquor. The aluminate solution entering the digester only when the cellulose is practically produced, precipitated silicate is prevented from passing through the digester and entering the preheater. If an upright digester and direct heating by steam are employed, the aluminate solution may, of course, be introduced as early as when the boiling is begun, whether the digester liquor is circulated or not.

If a sand filter is not used for the filtration of the fresh liquor, the silica content of the liquor is usually about 1 kg. per 1 cu. m. liquor. This quantity of silica, as well as the small quantity of silica which is extracted from the wood during the digestion, may suitably be precipitated by introducing the required quantity of aluminium hydroxide into the digester simultaneously with the wood chips, or with the digester liquor, whether indirect heating of the digester liquor during the digestion is employed or not.

When manufacturing such cellulose, for instance kraft pulp, in which a slight change of the colour of the pulp is immaterial, or may even be advantageous, the aluminium hydroxide may be introduced in the state of bauxite or the like at the same time as the wood chips or the digester liquor is charged into the digester. The digester liquor will then extract aluminium oxide in the state of sodium aluminate during the digestion, and such extraction is facilitated by the presence of the organic salts contained in the waste liquor. The cellulose obtained in this manner with the chemicals precipitated therein is often more suitable than ordinary cellulose for the subsequent production of several qualities of paper, which is due to the fact that the precipitated chemicals may wholly or partly take the place of paper glue as well as of paper colour in the paper manufacturing process.

When digesting esparto grass approximately 12 kg. $SiO_2$ per 1000 kg. esparto grass is extracted from the grass and goes into the waste liquor. This silica, and even a greater quantity, may be precipitated without disadvantage in the cellulose fibre in the state of sodium aluminium silicate by introducing at the beginning of the digestion about 8 to 10 kg. $Al_2O_3$ per 1000 kg. grass in the state of aluminate, or even in the state of bauxite, provided the colour of the same does not stand in the way of the intended use of the cellulose, when direct steam is used during the digestion. Again, if the digestion is performed by indirect heating, the statement above made as regards digestion of kraft pulp also applies.

When digesting ordinary rye and wheat straw with or without $Na_2S$ or $Na_2SO_3$, about 15 kg. silica per 1000 kg. straw goes into the waste liquor. Also in this case the silica may be precipitated on the fibre in the state of sodium aluminium silicate during the digestion, which is most suitably effected by adding the required quantity of aluminium oxide, about 10 to 15 kg., in the state of aluminate solution, or in other manner, as early as at the beginning of the digestion. When performing such digestion a rotary digester and direct steam heating are employed practically without exception.

Since when digesting straw and grass with caustic soda lye the silica is principally precipitated within the fibre in the state of an aluminium compound, the fibre does not become more brittle and harder than when digesting in the ordinary manner, when the silica is allowed to go freely into the waste liquor. This is particularly true when the aluminate solution is introduced before or at the beginning of the digestion.

If in view of the use for which the cellulose produced is intended, it is not permissible to precipitate the silica on the cellulosic fibre, the silica must be precipitated from the waste liquor, after said liquor has been separated from the cellulose. In such case precipitation is effected by adding to the waste liquor such quantity of sodium aluminate solution that the liquor contains at least 51 g. $Al_2O_3$ per 120 g. $SiO_2$ in the liquor, and intimately mixing said solutions with each other, preferably while hot.

Afterwards such quantity of cellulosic fibre or saw-dust is added that said substance takes up all aluminium silicate, after which the liquor is separated from the precipitate by means of suitable filtering devices. It is also possible to separate the precipitate by filtering the waste liquor, for instance through a saw-dust filter. However, a combination of these two methods is probably the best course. When saw-dust is used, the waste liquor always extracts a portion of the same, which proves of use if chemical products are afterwards produced from the waste liquor.

The hydroxides of the other metals above mentioned are utilized on the same principles as those above described in respect of aluminium hydroxide. Thus, such quantity of hydroxide is chosen that it lies between those quantities which correspond to formation of meta and orto silicates.

In those cases when it is not permissible to introduce organic substances in the alkaline waste liquor, which is to be relieved of silica, the sodium aluminium silicate may be precipitated by treating the waste liquor with cellulosic fibre or active carbon.

The advantages of the method above described are very great in practice, for instance when a waste liquor is to be concentrated for the purpose of further utilization, or when a regenerated caustic soda lye is to be concentrated. If the solution is free from silica the concentrating operation does not cause any troublesome incrustations in the evaporating apparatuses used.

It is obvious that it is also possible to add the metals in question, the silicates of which are insoluble or of limited solubility in the alkaline solutions, in the form of oxides, sulphates, or other suitable compounds, which when introduced into the solution, are transferred into hydroxides.

I claim:

1. The method of relieving silica-containing alkaline solutions, of silica, which consists in adding to the alkaline solution a compound of a metal the silicate of which is substantially insoluble in the alkaline solution so as to precipitate such metal silicate in the solution, treating the solution with an absorption agent capable of absorbing said silicate, and separating the absorption agent with the silicate absorbed thereby from the solution.

2. The method of relieving silica-containing alkaline solutions, of silica, which consists in adding to the alkaline solution a compound of aluminium so as to precipitate aluminium silicate in the solution, treating the solution with an absorption agent capable of absorbing said aluminium silicate, and separating the absorption agent with the aluminium silicate absorbed thereby from the solution.

3. In the process of producing cellulose by digesting cellulose-containing vegetable substances with an alkaline digester liquor, the method of relieving the digester liquor of silica, which consists in digesting the vegetable substances by boiling with an alkaline digester liquor to produce cellulosic fibre, adding to and intimately mixing with said digester liquor a compound of a metal the silicate of which is substantially insoluble in the digester liquor so as to precipitate such metal silicate on the cellulosic fibre produced by the digestion, and separating said cellulosic fibre with the silicate precipitated thereon from the liquor.

4. In the process of producing cellulose by digesting cellulose-containing vegetable substances with an alkaline digester liquor, the method of relieving the digester liquor of silica, which consists in digesting the vegetable substances by boiling with an alkaline digester liquor to produce cellulosic fibre, adding to and intimately mixing with said digester liquor a compound of aluminium so as to precipitate aluminium silicate on the cellulosic fibre produced by the digestion, and separating said celulosic fibre with the aluminium silicate precipitated thereon from the liquor.

5. In the process of producing cellulose by digesting cellulose-containing vegetable substances with an alkaline digester liquor, the method of relieving the digester liquor of silica, which consists in digesting the vegetable substances by boiling with an alkaline digester liquor to produce cellulosic fibre, adding bauxite to and intimately mixing the same with said digester liquor so as to precipitate aluminium silicate on the cellulosic fibre produced by the digestion, and separating said cellulosic fibre with the aluminium silicate precipitated thereon from the liquor.

ERIK LUDVIG RINMAN.